(12) United States Patent
Li et al.

(10) Patent No.: US 8,442,458 B2
(45) Date of Patent: May 14, 2013

(54) TECHNIQUES FOR BEAMFORMING USING PREDICTED CHANNEL STATE INFORMATION

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 12/908,637

(22) Filed: Oct. 20, 2010

(65) Prior Publication Data

US 2011/0032893 A1 Feb. 10, 2011

Related U.S. Application Data

(63) Continuation of application No. 12/426,716, filed on Apr. 20, 2009, which is a continuation of application No. 11/040,955, filed on Jan. 21, 2005, now Pat. No. 7,522,555.

(51) Int. Cl.
*H04B 17/00* (2006.01)
*H04B 1/00* (2006.01)
*H04B 1/02* (2006.01)
*H04J 3/08* (2006.01)

(52) U.S. Cl.
USPC ........ 455/101; 455/67.13; 455/63.1; 370/329

(58) Field of Classification Search .................. 455/63.1, 455/226.1, 67.13, 67.11, 101
See application file for complete search history.

(56) References Cited

U.S. PATENT DOCUMENTS

| | | | |
|---|---|---|---|
| 6,084,929 A | 7/2000 | Molnar et al. | |
| 6,570,864 B1 | 5/2003 | Kim et al. | |
| 7,110,378 B2 * | 9/2006 | Onggosanusi et al. | 370/334 |
| 7,330,701 B2 * | 2/2008 | Mukkavilli et al. | 455/69 |
| 7,522,555 B2 | 4/2009 | Li et al. | |
| 7,522,673 B2 | 4/2009 | Giannakis et al. | |
| 7,697,449 B1 | 4/2010 | Shirali et al. | |
| 7,852,963 B2 | 12/2010 | Chen et al. | |
| 8,009,778 B2 * | 8/2011 | Mielczarek et al. | 375/346 |
| 8,200,164 B2 * | 6/2012 | Trainin et al. | 455/69 |

(Continued)

FOREIGN PATENT DOCUMENTS

| | | |
|---|---|---|
| EP | 1463252 A1 | 9/2004 |
| GB | 2438101 B | 8/2010 |

(Continued)

OTHER PUBLICATIONS

Zhou, S. et al., "How accurate channel prediction needs to be for adaptive modulation in Rayleigh MIMO channels?", IEEE 2003 vol. 4, Apr. 6-10, 2003, pp. IV-81-84.

(Continued)

*Primary Examiner* — Tilahun Gesesse
(74) *Attorney, Agent, or Firm* — Kacvinsky Daisak PLLC (57) ABSTRACT

A system, apparatus, method and article to manage channel prediction for a wireless communication system are described. The apparatus may include a media access control processor to perform channel prediction, and a transceiver to communicate information using the channel prediction. Other embodiments are described and claimed.

17 Claims, 6 Drawing Sheets

U.S. PATENT DOCUMENTS

| | | | |
|---|---|---|---|
| 8,243,749 B2* | 8/2012 | Basson et al. | 370/441 |
| 8,280,445 B2* | 10/2012 | Yong et al. | 455/562.1 |
| 2002/0114269 A1* | 8/2002 | Onggosanusi et al. | 370/208 |
| 2002/0191703 A1 | 12/2002 | Ling et al. | |
| 2003/0003863 A1* | 1/2003 | Thielecke et al. | 455/39 |
| 2003/0017835 A1 | 1/2003 | Bergel | |
| 2004/0131022 A1 | 7/2004 | Ito | |
| 2004/0252632 A1* | 12/2004 | Bourdoux et al. | 370/210 |
| 2004/0259555 A1* | 12/2004 | Rappaport et al. | 455/446 |
| 2005/0047517 A1* | 3/2005 | Georgios et al. | 375/267 |
| 2006/0182077 A1 | 8/2006 | Scherzer et al. | |
| 2009/0257393 A1 | 10/2009 | Li et al. | |

FOREIGN PATENT DOCUMENTS

| | | |
|---|---|---|
| JP | 2003333013 A | 11/2003 |
| JP | 2004242338 A | 8/2004 |
| TW | 462150 | 11/2001 |
| TW | 508922 | 11/2002 |
| TW | I319295 | 1/2010 |
| WO | 03073647 | 9/2003 |
| WO | 2006/078498 A2 | 7/2006 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213, V8.7.0, May 2009, 13 pages.

Notice of Allowance for U.S. Appl. No. 11/040,955, mailed on Dec. 11, 2008, 10 pages.

Office Action for U.S. Appl. No. 11/040,955, mailed on May 1, 2008, 12 pages.

Office Action for U.S. Appl. No. 11/040,955, mailed on Nov. 7, 2007, 12 pages.

Office Action for Taiwanese Patent Application No. 95101184, mailed on Mar. 12, 2009, 7 pages of Office Action and 3 pages of Translation.

Office Action for China patent application No. 200680008842.5 mailed on Apr. 23, 2012, 12 pgs. of translated office action.

Office Action for China patent application No. 200680008842.5 mailed on Aug. 16, 2012, 20 pgs. including 11 pgs. English translation.

\* cited by examiner

TECHNIQUES FOR BEAMFORMING USING PREDICTED CHANNEL STATE INFORMATION

BACKGROUND

In a wireless communication system, wireless communication devices may transmit and/or receive radio frequency (RF) signals through one or more antennas. Some wireless communication devices may attempt to measure the characteristics of a communication channel, and modify transmission techniques based on the measured results. Techniques to improve such operations may improve performance for a wireless communication device, and potentially overall system performance.

DETAILED DESCRIPTION

Figure 1:
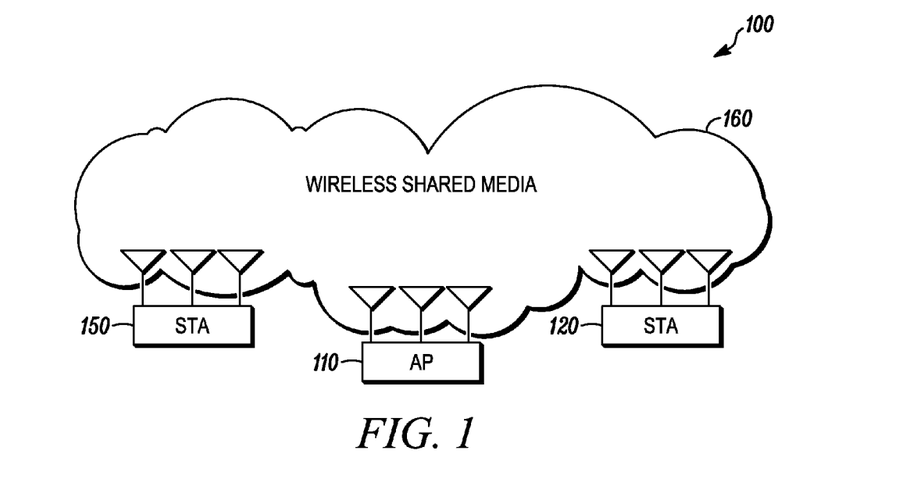
FIG. 1 illustrates a block diagram of a system in accordance with one embodiment.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, numerical information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with various wireless local area network (WLAN) protocols, such as the IEEE 802.11, 802.16, and 802.20 series of standard protocols. For example, the IEEE 802.16 series of standard protocols may include the IEEE 802.16-REVd Draft Standard For Local And Metropolitan Networks titled "Part 16: Air Interface For Fixed Broadband Wireless Access Systems," May 2004 ("802.16-REVd Draft Standard); and the IEEE 802.16e Draft Standard For Local And Metropolitan Networks titled "Part 16: Air Interface For Fixed And Mobile Broadband Wireless Access Systems, Amendment For Physical And Medium Access Control Layers For Combined Fixed And Mobile Operation In Licensed Bands," September 2004 ("802.16e Draft Standard"). The embodiments, however, are not limited in this context.

Referring again to FIG. 1, system 100 may comprise a wireless communication system. In one embodiment, for example, system 100 may comprise a Broadband Wireless Access (BWA) system operating in accordance with, for example, the IEEE 802.16 series of standard protocols, such as the IEEE 802.16-REVd Draft Standard and 802.16e Draft Standard. System 100 may include one or more wireless communication devices, such as a base station 110 and subscriber stations 120, 150. The wireless communication devices may all be arranged to communicate information signals using wireless shared media 160. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include various fixed devices, such as base station 110. Base station 110 may comprise a generalized equipment set providing connectivity, management, and control of another device, such as subscriber stations 120, 150. In one embodiment, for example, base station 110 may be implemented as a base station arranged to operate in accordance with the IEEE 802.16 series of protocols, such as the IEEE 802.16-REVd Draft Standard, the IEEE 802.16e Draft Standard, and so forth. For example, base station 110 may include a MIMO system having multiple transmitters/receivers ("transceivers") and multiple antennas. The embodiments are not limited in this context.

In one embodiment, system 100 may include various mobile devices, such as subscriber stations 120, 150. Subscriber stations 120, 150 may comprise generalized equipment sets providing connectivity between subscriber equipment and another device, such as base station 110, for example. In one embodiment, for example, subscriber stations 120, 150 may be implemented as subscriber stations arranged to operate in accordance with the IEEE 802.16 series of protocols, such as the IEEE 802.16-REVd Draft Standard, the IEEE 802.16e Draft Standard, and so forth. Examples of subscriber stations 120, 150 may include any mobile device, such as a mobile or cellular telephone, a computer or laptop equipped with a wireless access card, a handheld device such as a wireless PDA with wireless capabilities, an integrated cellular telephone/PDA, and so forth. The embodiments are not limited in this context.

As with base station 110, subscriber stations 120, 150 may each include a MIMO system having at least two transceivers and two antennas. The MIMO system, however, may have any number of transceivers and antennas. The embodiments are not limited in this context.

It is worthy to note that although system 100 is shown with wireless communication devices having a MIMO system and multiple antennas, it may be appreciated that other fixed and mobile devices having only a single transceiver and antenna may also be modified to utilize the techniques described herein, and still fall within the scope of the embodiments. The embodiments are not limited in this context.

In general operation, the nodes of system 100 may operate in multiple operating modes. For example, subscriber station 120, subscriber station 150 and base station 110 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160.

In one embodiment, one or more nodes of system 100 may use closed loop MIMO techniques. In a closed loop MIMO system, the transmitter typically uses channel state information when communicating information over a given MIMO communication channel. The channel state information may include values representing one or more characteristics of a channel. For example, the channel state information may be used to evaluate the channel quality or the received signal quality at the receiver after some processing, such as spatial demultiplexing. Examples of some channel characteristics may include signal to noise (SNR), carrier-to-interference-and-noise-ratio (CINR), and so forth. The particular number and type of channel characteristics measured for a given communication channel may vary according to a particular implementation, and the embodiments are not limited in this context.

In one embodiment, the channel state information may be used for a number of applications in a communications system to enhance performance of the system. For example, channel state information may be used in beamforming for a MIMO transceiver array, selecting an operating parameter for a system such as modulation coding scheme, and so forth. The type and number of applications are not limited in this context.

In one embodiment, for example, channel state information may allow the MIMO transmitter to use one or more beamforming techniques to improve channel throughput. A beamforming technique may represent a space-time processing technique directed to improving capacity for a given MIMO channel, and thereby improving the multiplexing gain. An example of a beamforming technique suitable for use by system 100 may be referred to as eigenbeamforming. Eigenbeamforming may effectively convert a MIMO channel into a bank of scalar coefficients, thereby reducing or eliminating potential crosstalk between the various scalar channels. The embodiments are not limited in this context.

Some beamforming techniques, however, may suffer from a problem of a mismatch between measured channel state information and actual channel state information. Depending on the technique used to measure channel state information, there may be a significant amount of delay between the measured channel state information, and the actual channel state information at the time information is transmitted by the MIMO system using the beamforming technique. This delay may be referred to herein as "feedback delay." On a slowly varying channel, the feedback delay may not substantially impact performance of the MIMO system. On a fading channel, however, the feedback delay may reduce the performance and efficiency of the MIMO system. For example, studies have suggested that some MIMO systems using closed loop MIMO techniques may potentially lose some or all performance gains when the speed of a subscriber station is 10 kilometers per hour (km/h) or higher. This may occur despite the fact that closed loop MIMO techniques typically provide a 4-5 decibel (dB) gain when compared to open loop MIMO techniques when the speed of a subscriber station is below 3 km/h. Consequently, reducing the impact of feedback delay on a MIMO system may potentially increase performance and efficiency of the MIMO system, particularly for fading channels.

Some embodiments may solve this and other problems. In one embodiment, for example, one or more nodes of system 100 may be arranged to perform channel prediction. More particularly, base station 110 and/or subscriber stations 120, 150 may be arranged to predict channel state information for a communication channel using previously measured channel state information. By predicting channel state information, the impact of feedback delay between measured channel state information and current channel state information may be reduced. Consequently, a transmitting device may transmit data over a MIMO channel using channel state information that is more accurate with respect to the actual MIMO channel state for a given point in time. Accordingly, system 100 may realize improved performance and efficiency relative to conventional techniques.

Figure 2:
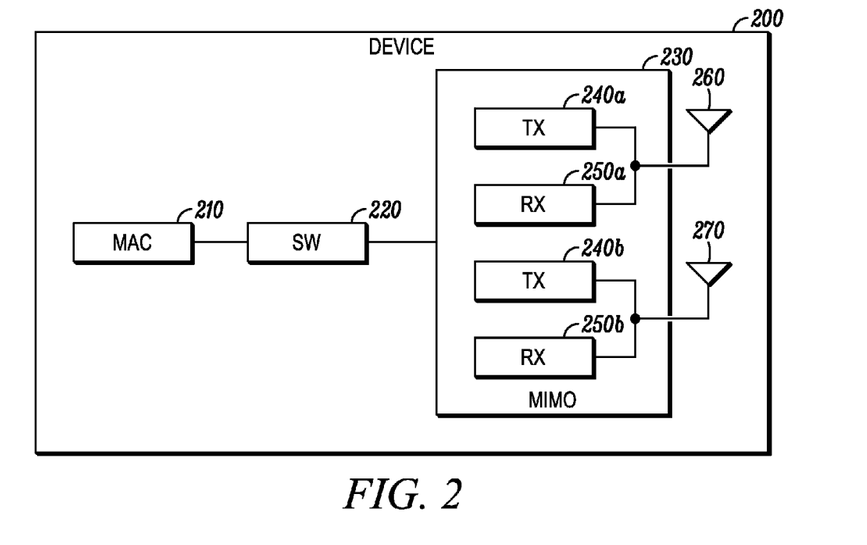
FIG. 2 illustrates a partial block diagram of a node in accordance with one embodiment.

FIG. 2 illustrates a partial block diagram of a node 200. Node 200 may be implemented as part of base station 110, subscriber station 120 and/or subscriber station 150 as described with reference to FIG. 1. As shown in FIG. 2, node 200 may comprise multiple elements, such as processor 210, switch (SW) 220, and a transceiver array 230. Some elements may be implemented using, for example, one or more circuits, components, registers, processors, software subroutines, or any combination thereof. Although FIG. 2 shows a limited number of elements, it can be appreciated that more or less elements may be used in node 200 as desired for a given implementation. The embodiments are not limited in this context.

In one embodiment, node 200 may include a transceiver array 230. Transceiver array 230 may be implemented as, for example, a MIMO system. MIMO system 230 may include two transmitters 240*a* and 240*b*, and two receivers 250*a* and 250*b*. Although MIMO system 230 is shown with a limited number of transmitters and receivers, it may be appreciated that MIMO system 230 may include any desired number of transmitters and receivers. The embodiments are not limited in this context.

In one embodiment, transmitters 240*a-b* and receivers 250*a-b* of MIMO system 230 may be implemented as Orthogonal Frequency Division Multiplexing (OFDM) transmitters and receivers. Transmitters 240*a-b* and receivers 250*a-b* may communicate data frames with other wireless devices. For example, when implemented as part of base station 110, transmitters 240a-b and receivers 250a-b may communicate data frames with subscriber station 120 and subscriber station 150. When implemented as part of subscriber station 120 and/or subscriber station 150, transmitters 240a-b and receivers 250a-b may communicate data frames with base station 110. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240a and receiver 250a may be operably coupled to an antenna 260, and transmitter 240b and receiver 250b may be operably coupled to antenna 270. Examples for antenna 260 and/or antenna 270 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. The embodiments are not limited in this context.

In one embodiment, node 200 may include a processor 210. Processor 210 may be implemented as a general purpose processor, such as a processor made by Intel® Corporation, for example. Processor 210 may also comprise a dedicated processor, such as a controller, microcontroller, embedded processor, a digital signal processor (DSP), a network processor, an input/output (I/O) processor, and so forth. The embodiments are not limited in this context.

In one embodiment, node 200 may include a memory (not shown). The memory may comprise any machine-readable or computer-readable media capable of storing data, including both volatile and non-volatile memory. For example, the memory may comprise read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

In one embodiment, for example, processor 210 may be arranged to perform MAC layer and/or physical (PHY) layer operations. For example, processor 210 may be implemented as a media access control (MAC) processor. MAC 210 may be arranged to perform MAC layer processing operations. In addition, MAC 210 may be arranged to predict channel state information for a MIMO channel.

As previously described, node 200 may support closed loop MIMO as defined by the IEEE 802.16 series of protocols, such as the IEEE 802.16-REVd Draft Standard and/or IEEE 802.16e Draft Standard, for example. In accordance with IEEE 802.16, base station 110 may sound the MIMO channel to measure certain channel characteristics. The channel sounding may be performed using sounding information, such as periodic sounding symbols, preambles, midambles, pilot symbols, and so forth. A subscriber station (e.g., 120, 150) may feed back the channel state information or beamforming matrices in response to the channel sounding by base station 110 or according to a request from base station 110. The embodiments are not limited in this context.

In one embodiment, a subscriber station (e.g., 120, 150) may feed back the channel state information or beamforming matrices for both frequency division duplexing (FDD) and time division duplexing (TDD) modes in response to the channel sounding by base station 110 or according to a request from base station 110. For a TDD system exploiting channel reciprocity, the two communicating devices may not necessarily need explicit channel feedback since they can periodically learn the channel from the reverse traffic, assuming the appropriate circuit calibration are performed and the communication channel changes relatively slowly. This technique is sometimes referred to as "implicit channel feedback." The embodiments are not limited in this context.

The feedback delay caused by channel sounding operations may be significant. For example, an 802.16 system may typically have a frame duration of approximately 5 milliseconds (ms). As a result, there may be approximately 10 ms of feedback delay between the channel sounding and the actual beamforming used by base station 110. In some instances, the feedback delay may even be greater than 10 ms for the end part of the beamformed packet. The channel state, however, may change significantly during the feedback delay interval, particularly for mobile channels which are prone to fading. This may be described in further detail with reference to FIG. 3.

Figure 3:
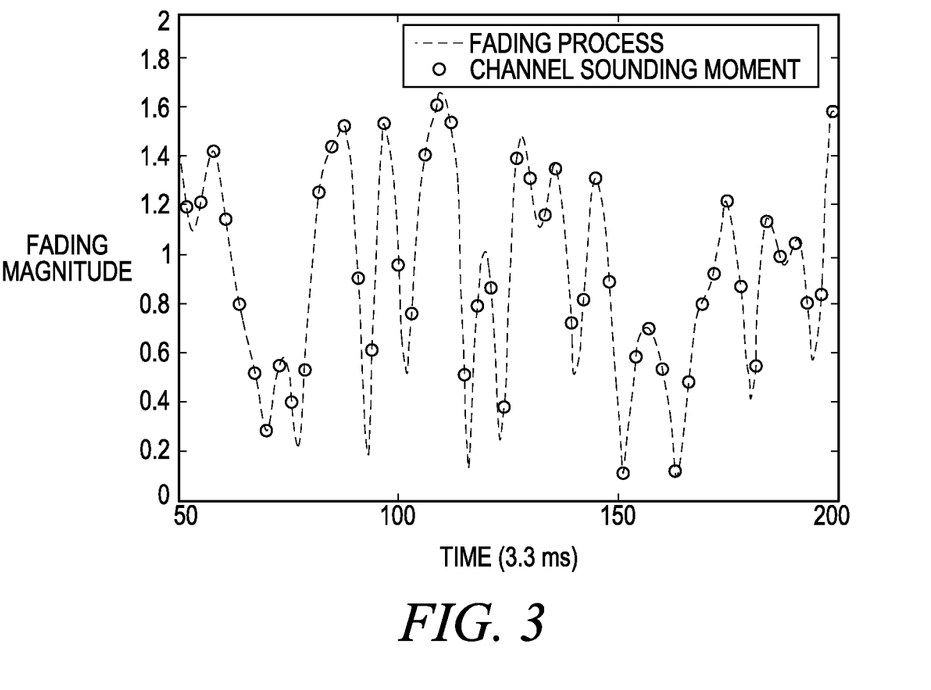
FIG. 3 illustrates a graph of a time varying fading channel and feedback delay in accordance with one embodiment.

FIG. 3 illustrates a graph of a time varying fading channel and feedback delay in accordance with one embodiment. FIG. 3 illustrates a graph having a fading magnitude with respect to time for a fading channel. The fading channel may be representative of a typical fading channel of a mobile device traveling at a speed of approximately 9 km/h and using an operating frequency band of approximately 2.6 Gigahertz (GHz). As illustrated by FIG. 3, the fading magnitude of a channel may change substantially over time, particularly during a typical feedback delay interval of 10 ms or more. If a closed-loop MIMO transmitter conducts beamforming using inaccurate channel state information, the formed beam is not likely to be pointed in the desired direction. Consequently, the feedback delay may significantly limit the application of closed-loop MIMO to mobile subscribers experiencing time varying fading channels, which is the type of environment for which 802.16e networks are specifically designed.

In one embodiment, node 200 may be used to measure channel state information for a closed loop MIMO channel formed using wireless shared media 160 between base station 110 and a subscriber station (e.g., 120, 150). The channel state information for a given channel may be measured by multiple nodes within system 100. For example, base station 110 may initiate channel sounding operations by sending sounding information in a downlink frame to subscriber station 120. Subscriber station 120 may measure one or more characteristics of the channel while receiving the sounding information. Subscriber station 120 may send an uplink frame with the measured channel state information to base station 110. In another example, base station 110 may send a request for subscriber station 120 to initiate channel sounding operations by sending sounding information to base station 110. Base station 110 may then measure the channel state information. The techniques used to measure channel state information may vary according to a given implementation, and the embodiments are not limited in this context.

The measurements may be performed over any number of time periods. For example, the measurements of a channel may be performed on a per frame basis using the preambles for each frame. The channel responses generated by the transmission of the preambles may be stored in memory, and indexed by frame number. In this manner, the number of measured channel state information may be retrieved for channel state prediction operations.

In one embodiment, MAC 210 of node 200 may be arranged to predict channel state information for a closed loop MIMO channel using the measured channel state information. The measured channel state information used for the prediction may cover any desired time interval for previous communications, such as X number of measured channel state information for X previous communicated frames. The embodiments are not limited in this context.

The channel state prediction operations may be performed by various nodes in system 100. For example, subscriber station 120 may be arranged to predict channel state information for some future point in time using measured channel state information stored by subscriber station 120. Subscriber station 120 may then forward the predicted channel state information to base station 110. In another example, base station 110 may be arranged to predict channel state information for the channel at a future point in time. Base station 110 may perform the channel state prediction operations using measured channel state information received from subscriber station 120, or as previously measured and stored by base station 110. It may be appreciated that channel state prediction operations may also be performed by other nodes in communication with system 100, not necessarily shown in FIG. 1, and still fall within the scope of the embodiments. The embodiments are not limited in this context.

In one embodiment, a node of system 100 may be arranged to predict channel state information for some future point in time using measured channel state information. The amount of time P used in the prediction may vary according to the amount of feedback delay anticipated by the system. For example, in the case where subscriber station 120 may receive sounding information from base station 110, and the average frame duration is 5 ms, the amount of anticipated feedback delay may comprise approximately 10 ms (e.g., 5 ms for the downlink frame and 5 ms for the uplink frame). Subscriber station 120 may predict the channel state information for P=10 ms into the future, thereby allowing for the anticipated feedback delay in the MIMO channel between base station 110 and subscriber station 120. In another example, in the case where base station 110 may instruct subscriber station 120 to perform channel sounding, the amount of anticipated feedback delay may be less than 10 ms if base station 110 is performing the measurements and generating the beamforming matrices. The amount of feedback delay and amount of time used in the prediction may vary according to a given implementation, and the embodiments are not limited in this context.

In one embodiment, channel state prediction operations may also be performed in multiple stages. In a first stage, for example, subscriber station 120 may predict channel state information for P ms into the future, and forward the predicted channel state information or beamforming matrices to base station 110. In a second stage, for example, base station 110 may receive the predicted channel state information or beamforming matrices from subscriber station 120, and may update the predicted channel state information before conducting the actual beamforming to account for any additional processing delay added by base station 110. For example, base station 110 may predict the beamforming matrix in M ms if beamforming is conducted P+M ms after channel sounding. Assuming P=10 ms and M=0.5 ms, for example, the total amount of predicted time may be 10.5 ms (e.g., 10 ms+0.5 ms=10.5 ms). It may be appreciated that these values are used by way of example only, and the embodiments are not limited in this context.

In one embodiment, channel state prediction operations may be performed in various modes. For example, channel state prediction operations may be performed on a periodic basis, discrete sample basis, packet or multiple packet basis, in response to an explicit request, on a continuous basis, and so forth. The various modes may be advantageous for a given set of design constraints. The embodiments are not limited in this context.

In one embodiment, for example, node 200 may be arranged to continuously perform channel state prediction operations. A continuous prediction mode may be particularly useful, for example, when transmitting longer beamformed packets. Continuous prediction mode may be implemented using regular or irregular spaced data. For example, base station 110 may receive channel state information periodically or not periodically. Base station 110 may receive information at regular time intervals (e.g., every 5 ms) or at irregular time intervals (e.g., 1, 7, 6, 3 ms). In the latter case, channel state prediction operations can be arranged to utilize the irregular spaced data. The needed information can be obtained using sounding information in the uplink packets received from a subscriber station. Based on the sounding information, base station 110 may determine that a longer packet size is appropriate for the channel. For example, assume the packet duration is approximately 2 ms. Base station 110 can be arranged to predict the channel change for this 2 ms period using the sounding information. The sounding information may comprise discrete samples or continuous data for shorter time periods. For example, the predicted channel response can be continuously updated for the period or the prediction is updated on a discrete sample basis (e.g., every 0.1 ms). For an 802.16e system, updating the prediction for a discrete sample point such as 0.1 ms may be sufficient for normal operations. Base station 110 can use the continuously updating predictions to send the packet to the subscriber station using a beamforming technique. The continuously updating beamforming matrix can be applied to both data symbols and pilot symbols so that the subscriber station can track the changes or update the beamforming matrix accordingly. The embodiments are not limited in this context.

In one embodiment, the results of the channel prediction operations may be measured and used to improve future channel prediction operations. A feedback loop may be established between the various nodes of system 100. The various nodes may be arranged to communicate the feedback delay or prediction period so that it improves the accuracy of future predictions. For example, base station 110 may communicate prediction results to subscriber stations 120, 150. Alternatively, subscriber stations 120, 150 may report the predicted quantity with a specified (e.g., estimated) delay. The embodiments are not limited in this context.

Once channel prediction operations have been performed, the predicted channel state information may be used for a number of applications to improve use of a communication channel. In one embodiment, for example, the predicted channel state information may be used to generate one or more beamforming matrices for use by MIMO transceiver array 230. In one embodiment, for example, the predicted channel state information may also be used to select other operating parameters for a communication channel. An example of the latter case may include a modulation coding scheme. The embodiments are not limited in this context.

In one embodiment, the predicted channel state information may be used to generate one or more beamforming matrices. Transceiver array 230 may use the beamforming matrices to communicate information between the various nodes of system 100. The information may comprise, for example, one or more packets, with each packet to comprise media information and/or control information. The media and/or control information may be represented using, for example, multiple OFDM symbols. A packet in this context may refer to any discrete set of information, including a unit, frame, cell, segment, fragment, and so forth. The packet may be of any size suitable for a given implementation. The embodiments are not limited in this context.

The beamforming matrices may be generated by various nodes within system 100. For example, subscriber station 120 may generate the beamforming matrices using the predicted channel state information stored by subscriber station 120 or received from another node of system 100. Subscriber station 120 may forward the beamforming matrices to base station 110. In another example, base station 110 may generate the beamforming matrices using the predicted channel state information stored by base station 110 or received from another node of system 100 (e.g., subscriber stations 120, 150). Transmitting the beamforming matrices instead of the predicted channel state information may consume less bandwidth in some applications. The embodiments, however, are not limited in this context.

In addition to using the predicted channel state information for beamforming, the predicted channel state information may also be used to select other operating parameters for a communication channel. For example, the predicted channel state information may be used to select a modulation coding scheme. In an 802.16 system, a subscriber station may also provide feedback regarding the type of modulation coding scheme that is appropriate for a given communications channel based on measured channel state information. The various parameters of a modulation coding scheme may include, for example, a modulation level, a code rate, a spatial multiplex mode, a diversity mode, and so forth. The subscriber station may suggest or recommend a modulation coding scheme, or a setting for a parameter of a modulation coding scheme, for the next packet based on the measured channel state information of a given channel. MAC 210 may use the predicted channel state information as input for the modulation coding scheme selection algorithm to provide a better modulation coding scheme for a given moment in time. The embodiments are not limited in this context.

Furthermore, the predicted channel state information can be used for the computation of any quantity that uses channel state information as one of the input arguments. For example, the CINR feedback information may comprise the signal to noise plus interference ratio (SINR) of each spatial stream at the output of the spatial de-multiplexer at the receiver. The spatial demultiplexer may be arranged to perform minimum mean square error (MMSE) spatial decoupling. The quantity may depend on channel state information, noise level, transmission scheme, and spatial demultiplexer technique. The SINR computation can employ the predicted channel state information in both estimating the future received signal level and the computation of the spatial de-multiplexer (e.g., MMSE filter weights). The predicted SINR may be fed back instead of the SINR computed from the current channel state information. In addition to MMSE spatial decoupling, the predicted channel state information may be used to perform maximum likelihood spatial decoupling, successive cancellation decoupling, and so forth. The embodiments are not limited in this context.

It is worthy to note that although the predicted channel state information is described for use with various applications as described above, it may be appreciated that the predicted channel state information may be suitable for other applications, such as configuring various other operating parameters for a 802.16 system that are based in whole or in part upon channel state information for a given communications channel. The embodiments are not limited in this context.

The actual channel prediction may be performed in a number of different ways. For example, predicting channel state information may be performed using a filter. The filter may be implemented using hardware, software, or a combination of both. In one embodiment, for example, the filter may be a software filter executed by MAC 210 of node 200. The filter may comprise a finite impulse response (FIR) filter having multiple filter taps 1-N, where N may represent any positive integer. Each filter tap may represent a FIR coefficient/delay pair. In one embodiment, for example, the FIR filter may be implemented using a 5-tap filter (e.g., N=5). In this example, the input to the 5-tap filter may comprise 5 previous channel responses estimated from the preambles of the previous 5 frames. The filter is derived with low complexities from 5 autocorrelation coefficients of the fading process, which may be computed from previous preambles. Simulation results demonstrate that the varying channel can be predicted using a 5-tap FIR filter with error rates of 20% or less. With this prediction technique, approximately 2-4 dB gain can be obtained over a system without channel prediction. The number of filter taps may vary according to a given set of design constraints, and the embodiments are not limited in this context.

In one embodiment, the filter may comprise a linear one-step predictor, which is essentially a special kind of Wiener-Hopf filter. Using a more sophisticated estimator such as a Multiple Signal Classification (MUSIC) filter may be advantageous for implementations anticipating vehicle speeds of 10 km/h or more. The filter types may vary according to a given set of design constraints, and the embodiments are not limited in this context.

Figure 4:
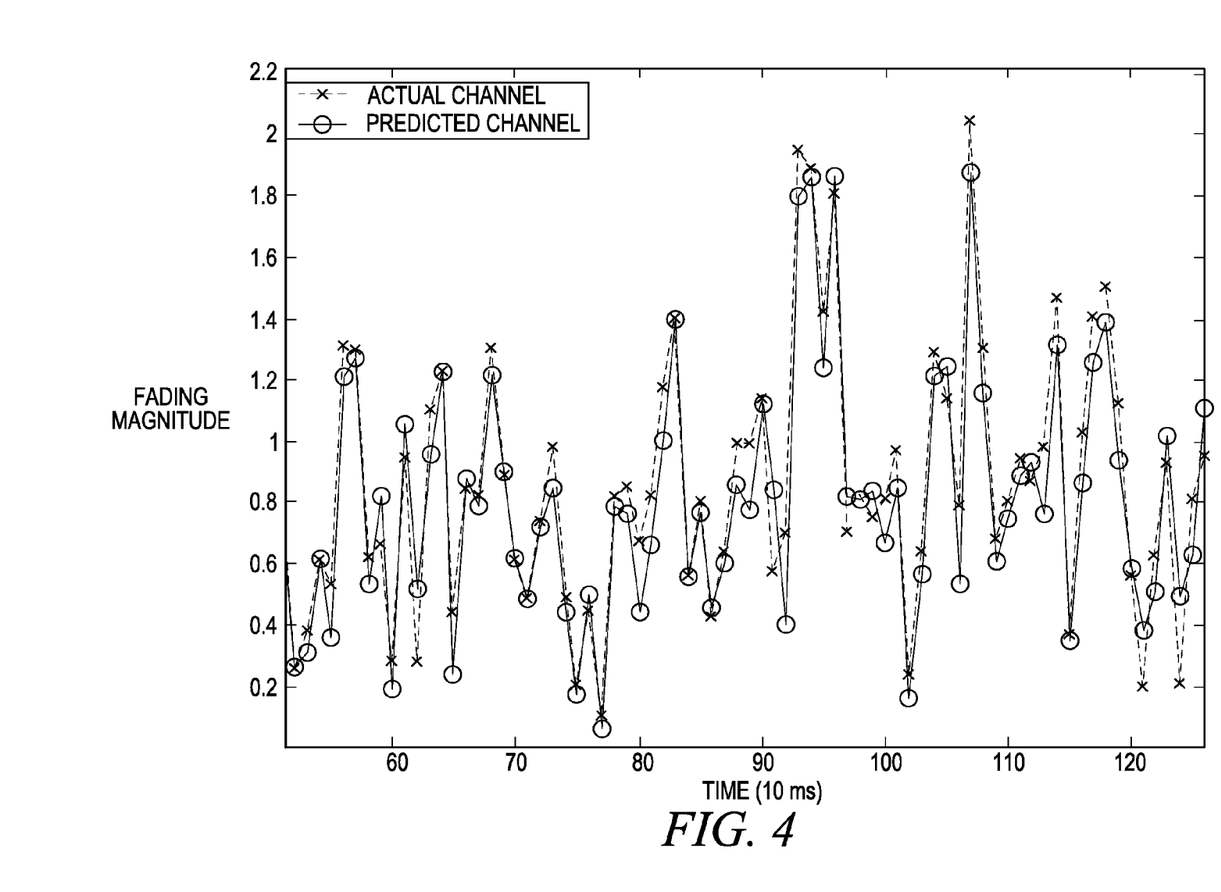
FIG. 4 illustrates a graph of a fading magnitude of a predicting filter in accordance with one embodiment.

FIG. 4 illustrates a graph of a fading magnitude of a predicting filter in accordance with one embodiment. FIG. 4 illustrates the performance of a 5-tap filter used in channel prediction operations. As shown by FIG. 4, the fading magnitude of a channel closely matches the predicted fading magnitude using the 5-tap filter. In fact, FIG. 4 illustrates that the error rates between predicted channel state information and actual channel state information is approximately 20% or less using the 5-tap filter.

Figure 5:
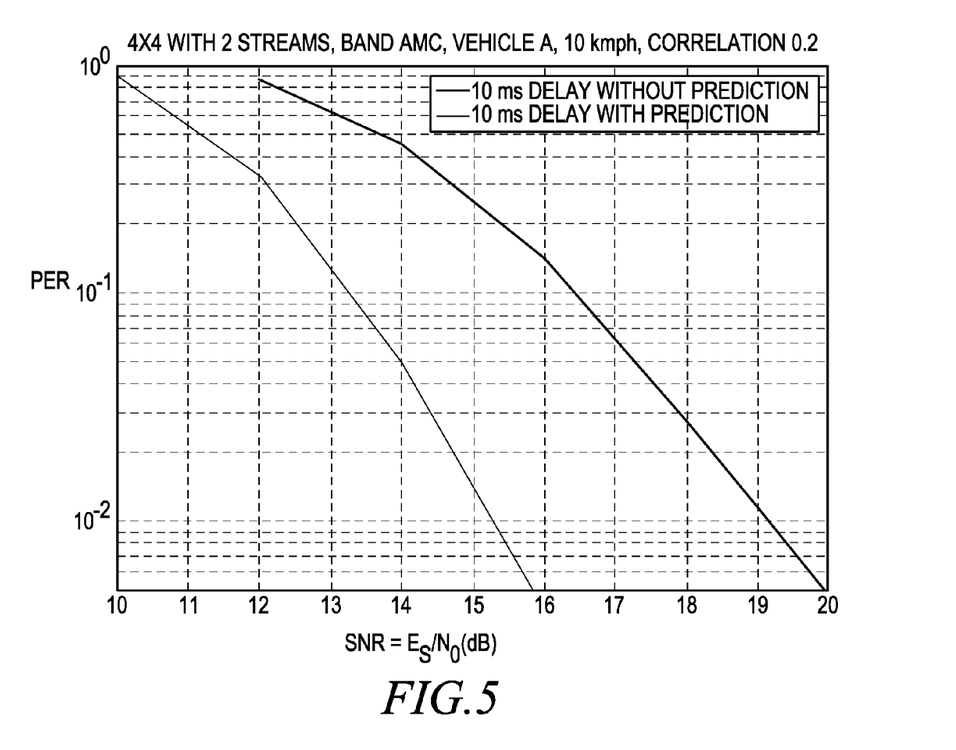
FIG. 5 illustrates a graph of packet error rates (PER) for systems with and without channel prediction in accordance with one embodiment.

FIG. 5 illustrates a graph of packet error rates (PER) for systems with and without channel prediction in accordance with one embodiment. FIG. 5 illustrates the PER relative to the signal-to-noise ratio (SNR) for a system using channel prediction and for a system not using channel prediction. Assuming a feedback delay of 10 ms, FIG. 5 shows that the PER for a system using channel prediction is significantly lower for the same SNR relative to a system without channel prediction.

Figure 6:
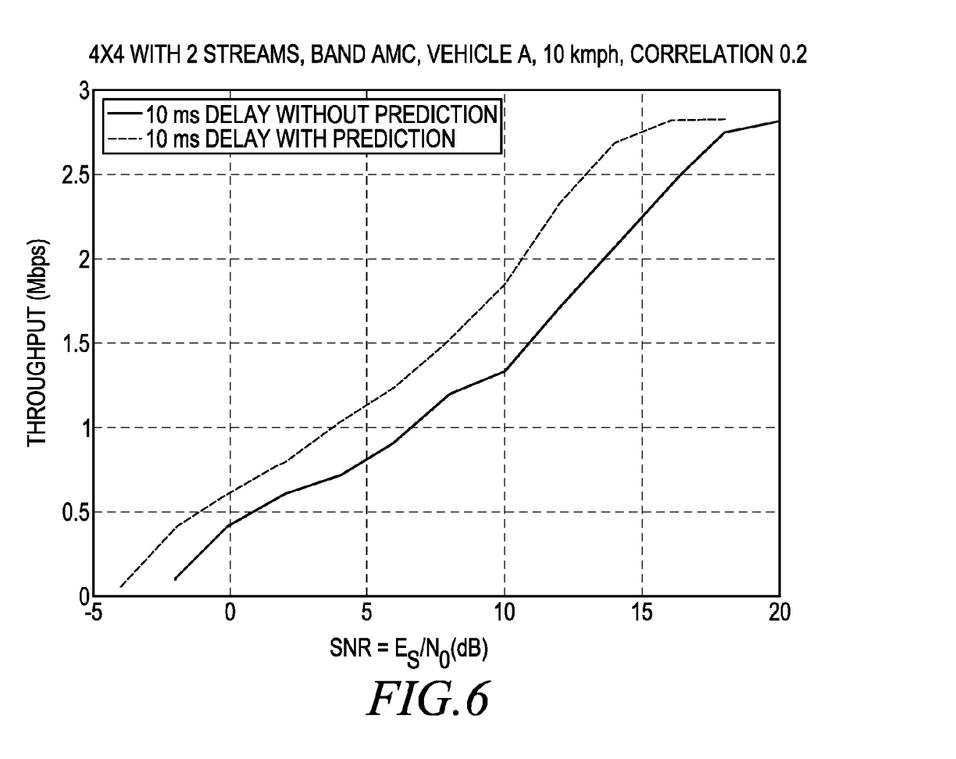
FIG. 6 illustrates a graph of throughputs for systems with and without channel prediction in accordance with one embodiment.

FIG. 6 illustrates a graph of throughputs for systems with and without channel prediction in accordance with one embodiment. FIG. 6 illustrates the throughput in Mega-bits-per-second (Mbps) relative to the SNR for a system using channel prediction and for a system not using channel prediction. Assuming a feedback delay of 10 ms again, FIG. 6 shows that the throughput for a system using channel prediction is significantly higher for the same SNR relative to a system without channel prediction.

Operations for the above embodiments may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 7:
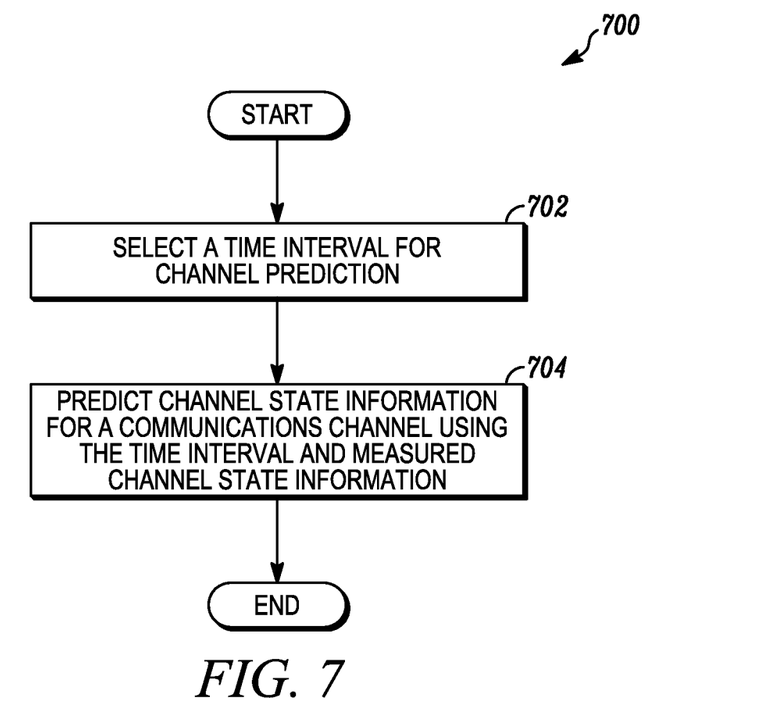
FIG. 7 illustrates a programming logic in accordance with one embodiment.

FIG. 7 illustrates a programming logic in accordance with one embodiment. Programming logic 700 may be representative of the operations executed by one or more systems described herein, such as node 200 as implemented as part of base station 110 or subscriber stations 120, 150, for example. As shown in programming logic 700, a time interval for channel prediction may be selected at block 702. The time interval may comprise, for example, a feedback delay interval anticipated for a given system. Channel state information for a closed loop MIMO channel may be predicted using the time interval and measured channel state information at block 704.

In one embodiment, information may be transmitted over the closed loop MIMO communications channel using the predicted channel state information. The information may comprise, for example, a packet having one or more OFDM symbols. The information may be transmitted by a MIMO transceiver array having multiple antennas. The embodiments are not limited in this context.

In one embodiment, the predicted channel state information may be transmitted over the MIMO communications channel. This may occur, for example, if a subscriber station performs the channel prediction, and the subscriber station sends the predicted channel state information to another device, such as a base station. The embodiments are not limited in this context.

In one embodiment, a beamforming matrix may be generated using the predicted channel state information. For example, the MIMO transceiver array may use a beamforming matrix to communicate the information. The beamforming matrix may be used, for example, to control the direction in which the information is to be transmitted by the MIMO transceiver array. The beamforming matrix may be generated by any number of devices in the system, such as base station 110 and/or subscriber stations 120, 150, for example. The embodiments are not limited in this context.

In one embodiment, a beamforming matrix generated using the predicted channel state information may be transmitted over the MIMO communications channel. This may occur, for example, if a subscriber station generates the beamforming matrix, and the subscriber station sends the beamforming matrix to another device, such as a base station. The embodiments are not limited in this context.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a media access control processor to predict channel state information for a communications channel using measured channel state information and to generate beamforming information using said predicted channel state information, said measured channel state information comprising channel responses for previously communicated frames of information; and
a transmitter to transmit said beamforming information generated using said predicted channel state information.

2. The apparatus of claim 1, wherein said media access control processor is to select a modulation coding scheme for said channel using said predicted channel state information.

3. The apparatus of claim 1, wherein said predicted channel state information is used to perform minimum mean square error (MMSE) spatial decoupling.

4. The apparatus of claim 1, wherein said communications channel is a closed loop multiple-input-multiple-output communications channel.

5. The apparatus of claim 1, further comprising a filter having multiple filter taps, with each filter tap to receive as input a corresponding channel response for one of said previously communicated frames.

6. The apparatus of claim 1, wherein beamforming information is representative of a beamforming matrix.

7. A system, comprising:
a media access control processor to predict channel state information for a communications channel using measured channel state information and to generate a beamforming matrix using said predicted channel state information, the media access control processor to predict the channel state information for a future duration determined based on an anticipated feedback delay of the measured channel state information; and
a transceiver array having multiple transmitters and multiple antennas, said transceiver array to connect to said media access control processor to transmit information associated with said beamforming matrix.

8. The system of claim 7, wherein said communications channel is a closed loop multiple-input-multiple-output communications channel.

9. The system of claim 7, wherein said transceiver array is to transmit information over said communications channel using said predicted channel state information.

10. The system of claim 7, wherein said transceiver array is to transmit a packet having orthogonal frequency division multiplexing symbols over said communications channel using said predicted channel state information.

11. The system of claim 7, wherein said information associated with said beamforming matrix is precoding information.

12. The system of claim 7, wherein said transceiver array is to transmit said information associated with said beamforming matrix generated using said predicted channel state information.

13. The system of claim 7, wherein said information associated with said beamforming matrix is a scalar.

14. A method, comprising:
selecting, by a processor circuit, a time interval for channel prediction for a communications channel based on an anticipated feedback delay of measured channel state information for said communications channel;
predicting channel state information for said communications channel using said time interval and said measured channel state information;
generating information about a beamforming matrix using said predicted channel state information; and
transmitting said information about said beamforming matrix generated using said predicted channel state information.

15. The method of claim 14, further comprising transmitting information over said communications channel using said predicted channel state information.

16. The method of claim 14, further comprising transmitting said predicted channel state information.

17. The method of claim 14, wherein said information about said beamforming matrix is a beamforming indicator.

* * * * *